(12) United States Patent
Talpaert et al.

(10) Patent No.: US 6,818,309 B1
(45) Date of Patent: Nov. 16, 2004

(54) TRANSPARENT SUBSTRATE PROVIDED WITH A SILICON DERIVATIVE LAYER

(75) Inventors: Xavier Talpaert, Paris (FR); Michel Simonet, Charnay les Macon (FR); Marie-Jose Azzopardi, Vincennes (FR); Anne Durandeau, Paris (FR)

(73) Assignee: Saint-Gobian Glass France, Courbevoie (FR)

(*) Notice: Subject to any disclaimer, the term of this patent is extended or adjusted under 35 U.S.C. 154(b) by 0 days.

(21) Appl. No.: 10/111,413
(22) PCT Filed: Oct. 31, 2000
(86) PCT No.: PCT/FR00/03037
§ 371 (c)(1), (2), (4) Date: Aug. 21, 2002
(87) PCT Pub. No.: WO01/32578
PCT Pub. Date: May 10, 2001

(30) Foreign Application Priority Data
Nov. 5, 1999 (FR) .............................. 99 13937

(51) Int. Cl.⁷ .................... B32B 17/06; B32B 23/00
(52) U.S. Cl. .............. 428/432; 428/428; 428/447; 428/448; 428/336; 428/698
(58) Field of Search ................. 428/426, 428, 428/432, 446, 448, 336, 698

(56) References Cited

U.S. PATENT DOCUMENTS 6,350,397 B1 * 2/2002 Heikkila et al. .............. 264/39

FOREIGN PATENT DOCUMENTS

| EP | 0 518 755 | 12/1992 |
| EP | 0 594 171 | 4/1994 |
| EP | 1 022 588 | 7/2000 |
| FR | 2 787 590 | 6/2000 |
| JP | 01 119421 | 5/1989 |
| JP | 02 296752 | 12/1990 |
| WO | 00 32391 | 6/2000 |

* cited by examiner

Primary Examiner—Stephen Stein
(74) Attorney, Agent, or Firm—Oblon, Spivak, McClelland, Maier & Neustadt, P.C.

(57) ABSTRACT

The subject of the invention is a transparent substrate, especially made of glass, provided on at least one of its faces with a layer based on an at least partially oxidized silicon derivative chosen from silicon dioxide or silicon oxides which are substoichiometric in terms of oxygen, silicon oxycarbide or silicon oxynitride, and having a hydrophilic character.

48 Claims, 3 Drawing Sheets

TRANSPARENT SUBSTRATE PROVIDED WITH A SILICON DERIVATIVE LAYER

The invention relates to the deposition of thin layers, especially those having an interferential thickness, on transparent substrates so as to confer a particular functionality on them.

The transparent substrates may be made of an organic polymer, of a glass ceramic or, preferably, of a glass, in various applications, detailed below, of the glazing, screen or mirror type.

A recurrent problem with transparent substrates of the glass type (or with semi-transparent substrates) is that of they gradually become fouled, requiring tedious periodic cleaning. Another problem is the phenomenon of condensation, when it causes undesirable misting in contact with water vapour and, beyond simple misting, a build-up of water droplets preventing vision.

At least partial solutions have already been proposed: thus, coatings are known which are based on a fluoropolymer whose highly hydrophobic surface allows water to be rejected and less dirt to be attached. Coatings having photocatalytic properties are also known, for example those comprising anatase-crystallized titanium oxide, which are effective for degrading at least organic dirt by oxidation.

These various types of coating are effective but relatively complex. Furthermore, none of them solves all the above mentioned problems optimally. Thus, hydrophobic coatings do not prevent the condensation phenomenon and, in contrast, photocatalytic coatings are only truly effective when exposed to ultraviolet radiation and can therefore be used more outside a dwelling than inside it.

The invention therefore aims to find coatings which are simple to use and are capable of facilitating the cleaning of glass-type or similar substrates and/or of lessening the phenomenon of water vapour condensation on their surface or at the very least of preventing the condensation from resulting in the appearance of misting or of a multitude of droplets.

The subject of the invention is a transparent substrate, especially made of glass, provided on at least one of its faces with a layer based on an at least partially oxidized silicon derivative chosen from silicon dioxide, silicon oxycarbide or silicon oxynitride, and having a hydrophilic character.

Within the context of the invention, the silicon derivative may comprise only the elements Si and O in the case of $SiO_2$, the elements Si, O and N in the case of an oxynitride and the elements Si, O and C in the case of an oxycarbide. However, the silicon derivative according to the invention also includes materials furthermore containing, in minor amounts (by weight) compared with silicon, at least one metal such as aluminium, zinc or zirconium. The addition of a metal may have three advantages. By reactive sputtering, this addition amounts to "doping" the Si target in order to make it more conducting, thereby speeding up/facilitating the deposition. Furthermore, whatever the method of deposition (for example by pyrolysis), the addition of a metal of the aluminium type can increase the durability of the material, most particularly if it contains little or no carbon/nitrogen. Finally, the addition of a controlled amount of this type of metal into the layer makes it possible to vary its refractive index, especially to increase it (aluminium oxide has in an index of about 1.65, while zinc and zirconium oxides have an index of about 2).

Within the context of the invention, the silicon derivative also includes silicon oxides which are substoichiometric in terms of oxygen, of formula $SiO_x$, where x is less than 2.

The invention has thus revealed a novel characteristic of this type of material, namely a certain hydrophilicity giving it unexpected properties: it was noticed that the substrate, preferably glass, provided with this type of layer cleans much more easily than a bare glass (less friction force for cleaning the glass with a cloth, most of the dirt being removed without any effort by spraying water). Furthermore, the rate of fouling was observed to be less, making it possible to reduce the frequency of the cleaning operations, this effect being more marked if the glass is on the outside and exposed periodically to rain: by running down the glass, rain naturally carries away the dirt. The third unexpected effect is that any water condensation phenomenon on the surface of the glass coated in this way does not reduce visibility through the glazing or reduces it very little: it seems that the water appears in the form of an invisible, transparent and homogeneous liquid film, and no longer in the form of droplets.

The same improvements are observed when comparing a glass provided with a multilayer film surmounted by the layer according to the invention with a glass provided only with the multilayer film (for example a film having a solar-control or low-emissivity function or an optical function, terminating in a layer which is chemically different from that of the invention, for example a layer of a metal oxide or metal nitride).

These advantageous effects may be adjusted/increased by varying the chemical composition, the surface appearance and the method of deposition chosen.

Thus, the layer may have a refractive index of about 1.45 (pure $SiO_2$) or greater than 1.45 in the case of a silicon suboxide or if the derivative contains carbon or nitrogen. Advantageously, in the latter cases, the refractive index is adjusted to be between 1.45 and 1.80, especially between 1.50 and 1.75 or between 1.55 and 1.68. The term "refractive index" should be understood to mean within the context of the invention either its refractive index within the usual meaning of the term when the layer is homogeneous with regard to composition and with regard to index through its thickness, or its apparent average index when the layer has a composition or an index which varies through its thickness. One advantageous embodiment of the invention relates in fact to layers whose refractive index decreases from the carrier substrate to the external surface of the layer.

There are two advantages in choosing a low refractive index:
- on the one hand, the index is close to that of the glass when this is the substrate, thus preventing the glass from having a reflective appearance;
- on the other hand, the more the refractive index tends to higher values, and the more the C or N content increases to the detriment of oxygen, and it turns out that the hydrophilicity of the layer is enhanced by increasing its oxygen content.

Another parameter that can influence the hydrophilicity of the layer is its surface roughness which, in certain embodiments of invention, is much higher than that of a standard bare glass.

The layer according to the invention may be deposited by any type of process capable of depositing thin layers of this type: the process may be a vacuum process such as sputtering, especially magnetic-field-enhanced sputtering (for example starting with a silicon target, optionally doped with boron or with aluminium). In order to favour the formation on the surface of Si—OH groups favourable to high hydrophilicity, it is possible to use a reactive atmosphere containing, for example, in addition to a purely oxidising compound of the $O_2$ type, a compound containing hydrogen and/or to use a compound containing both hydrogen and oxygen. The reactive atmosphere may thus contain an $O_2/H_2$, $O_2/H_2O$ or $H_2O_2$ mixture when a silicon oxide is manufactured. When a silicon oxynitride is to be deposited, it is possible to use reactive atmospheres comprising, as nitrogen and/or hydrogen compounds for example, an amine, an imine, hydrazine or ammonia. The $SiO_2$ (optionally doped with a small amount of a metal or with boron)—based layers deposited by reactive sputtering may have quite variable refractive indices. Depending on the deposition parameters chosen, especially the pressure when sputtering the target, the refractive index (averaged between 380 and 780 nm) of the layers may thus be in the region of 1.4–1.5, resulting in quite dense layers. It may also have a lower value of about 1.25–1.40, especially 1.28–1.35, for example, around 1.30 (to within ±0.05). In this case, the layers are therefore less dense, with a certain amount of porosity and/or surface roughness which may favour their hydrophilicity.

Preferably, the deposition may be carried out by a sol-gel route or by pyrolysis, especially by CVD (Chemical Vapour Deposition). In the case of deposition by a sol-gel route, the sol may comprise a precursor based on tetraethyl orthosilicate TEOS and be deposited by known techniques such as dipping, spray coating or spin coating, or else the deposition method referred to as flow coating. In the case of deposition by CVD, a silicon precursor in the form of an $SiH_4$ type silane may thus be used. The silicon precursor may also be an organosilane, of the $RSiX_3$ type, where X is a halogen of the chlorine type and R is an alkyl (which is linear or branched, having, for example, from 1 to 10 carbon atoms or more). It may be an organosilane of the $R_ySiX_{4-y}$ type, with the same conventions regarding R and X, or a compound belonging to the family of ethoxysilanes. Other gases/precursors may be added to the silicon precursor(s), such as ethylene or a nitrogen-containing derivative such as ammonia or an amine (especially a primary amine). An oxidising agent ($O_2$, $H_2O$, $H_2O_2$, etc, )may also possibly be present.

It has also been noticed that a certain amount of surface roughness in the layer favours the above mentioned beneficial effects thereof, which roughness can be controlled especially by the parameters governing the deposition of the layer and by the actual preparation of the surface on which the layer proper is deposited.

The measured contact angle between water and the coatings according to the invention is advantageously less than 35°, or less than or equal to 25°, for example between 15° and 25°: this actually denotes hydrophilicity (to be compared with the contact angle on standard bare glass which is in general 40°). This is not necessarily a very high degree of hydrophilicity which results in the beneficial effects of the invention, or is even modest hydrophilicity, but, being significantly greater than that of bare glass, it is effective. The condensation phenomenon is not necessarily eliminated, but it does prevent the appearance of drops (in fact when the contact angle is less than 7° or 10°, the mist becomes invisible, even though condensation is still present).

According to certain embodiments, and especially in the case of layers deposited by CVD, the contact angle may be less than 15°, and even especially less than 10°.

The layer according to the invention may have a chemical composition which varies through its thickness. Advantageously it may have an oxygen concentration increasing towards its "external" surface (that is to say its surface furthest away from the carrier substrate). It is thus possible to have a silicon oxycarbide or oxynitride layer which is markedly richer in C or N near its surface closest to the substrate, and richer in O near its external surface, as far as even forming an almost pure (thin) layer of $SiO_2$ on top of a layer having a chemical composition richer in C or in N; or even a layer of almost pure Si or $Si_3N_4$. This oxygen concentration gradient may be obtained by adjusting the deposition conditions or by surface oxidation after deposition, for example by a heat treatment.

A high oxygen concentration on the surface of the layer is in fact favourable in the sense that it results in a high content of hydroxyl bonds Si—O—H on the surface, making it hydrophilic.

The layer according to the invention preferably has a thickness of at least 5 nm, especially between 5 and 100 nm, for example between 10 and 60 nm.

The layer of the invention may form part of a film of thin layers, by being the final layer of the film (or an additional layer to a given film), this layer being the furthest from the substrate. It may, for example, be an antireflection film (an alternation of layers with a high refractive index and layers with a low refractive index, such as $TiO_2/SiO_2/TiO_2$/layer according to the invention, the $TiO_2$ possibly being substituted with $Nb_2O_5$, $Si_3N_4$, $SnO_2$, etc). It may also be a film of the solar-control type, such as a film of the type consisting of an optional sublayer/TiN/layer according to the invention or a solar-control layer based on $TiO_2$ or a mixed iron cobalt and chromium oxide: glazing thus coated is sold by Saint-Gobain Glass France under the name "Vision-Lite", "Starélio and "Antélio" respectively. It may also include multilayer films comprising at least one silver-based layer having a low-emissivity or solar-control function (glazing thus coated being sold by Saint-Gobain Glass France under the name "Planitherm"), or low-emissivity films whose functional layer is based on fluorine-doped tin oxide (glazing thus coated being sold by Saint-Gobain Glass France under the name of "EKO" glazing), or else solar-control films whose functional layer is based on steel or an Ni/Cr alloy (glazing thus coated being sold by Saint-Gobain Vitrage under the name of "Cool-Lite" glazing). For further details, the reader may refer to the patents EP-638 528, EP-718 250, EP-511 901, EP-728 712, W097/43224, EP-638 527 and EP-573 325.

When the substrate is made of glass, it may be curved and/or toughened or annealed before or after deposition of the layer or layers.

The subject of the invention is also the application of the substrates described above to the manufacture of glazing with an "anticondensation" effect and/or an "antisoiling" effect and/or easily cleanable glazing (within the context of the invention, "anticondensation" means that there may be condensation, but it entails none or few of the negative consequences on visibility through the glazing). The glazing may be for buildings, for vehicles, for mirrors, and most especially for bathroom mirrors, rear view mirrors, shower cabinet glass, glazed doors and internal partitions, urban furniture, display panels and display screens of the television or computer screen type.

BRIEF DESCRIPTION OF THE DRAWINGS

The invention will be described in greater detail with the help of non-limiting examples and the following figures.

In all the examples, 50 nm silicon oxycarbide layers were deposited on a clear silica-soda-lime glass of the "Planilux" type sold by Saint-Gobain Glass France by CVD (for example, according to patent EP-518 755) using $SiH_4$, ethylene and possibly an oxidising compound, by varying the amount of precursors and the deposition temperatures so that the layers had refractive indices of about 1.58 to 1.75. It was confirmed that it was the glasses coated with SiOC layers having the lowest refractive indices which were the most hydrophilic and the most effective in terms of reducing the rate of fouling. It was also these glasses that had the most pronounced "anticondensation" effect, although they had a contact angle with water which is not very low, about 15°–30°. It should be noted that the layers having a lower index tending towards that of the glass (index 1.52), therefore only modify the appearance of the glass very little: other examples according to the invention have contact angles below 15° or 10°.

Coatings deposited by pyrolysis have the advantage of being able to be continuously deposited directly in a float line.

The coatings as obtained are in general remarkably durable.

EXAMPLES 1–4

Table 1 below gives, for Examples 1, 2, 3 and 4, the refractive indices n of four silicon-oxycarbide-based layers thus obtained, and the values (θ) of the contact angle with water after cleaning, and the result of a test consisting in storing the glasses coated with the layer for eighteen hours at 30° C. in an atmosphere having a relative humidity of 95% ("YES" means that there is an "antimisting" effect, in the sense that no visible water droplets appear on the layer, while "No" means that such droplets are visible to the naked eye). The cleaning, using a surfactant, was carried out in two steps, by rinsing with town water, the cleaning being completed by a final rinse using deionized water, and then dried in a stream of nitrogen.

TABLE 1

|  | n | θ | TEST |
|---|---|---|---|
| Example 1 | 1.58 | 14° | YES |
| Example 2 | 1.68 | 23° | YES |
| Example 3 | 1.71 | 27° | YES/NO |
| Example 4 | 1.75 | 31° | NO |

From this data, it may be seen that the most beneficial layers are those which have the lowest refractive index, less than 1.70. It is these which also are the most hydrophilic and the richest in oxygen.

EXAMPLES 5–7

These consisted of a Planilux glass surmounted by a 50 nm layer of SiOC obtained as previously. Table 2 below gives, for these examples, their refractive indices n (the glasses were cleaned before deposition of the layers, as previously).

TABLE 2

|  | n |
|---|---|
| Example 5 | 1.68 |
| Example 6 | 1.58 |
| Example 7 | 1.71 |

Figure 1:
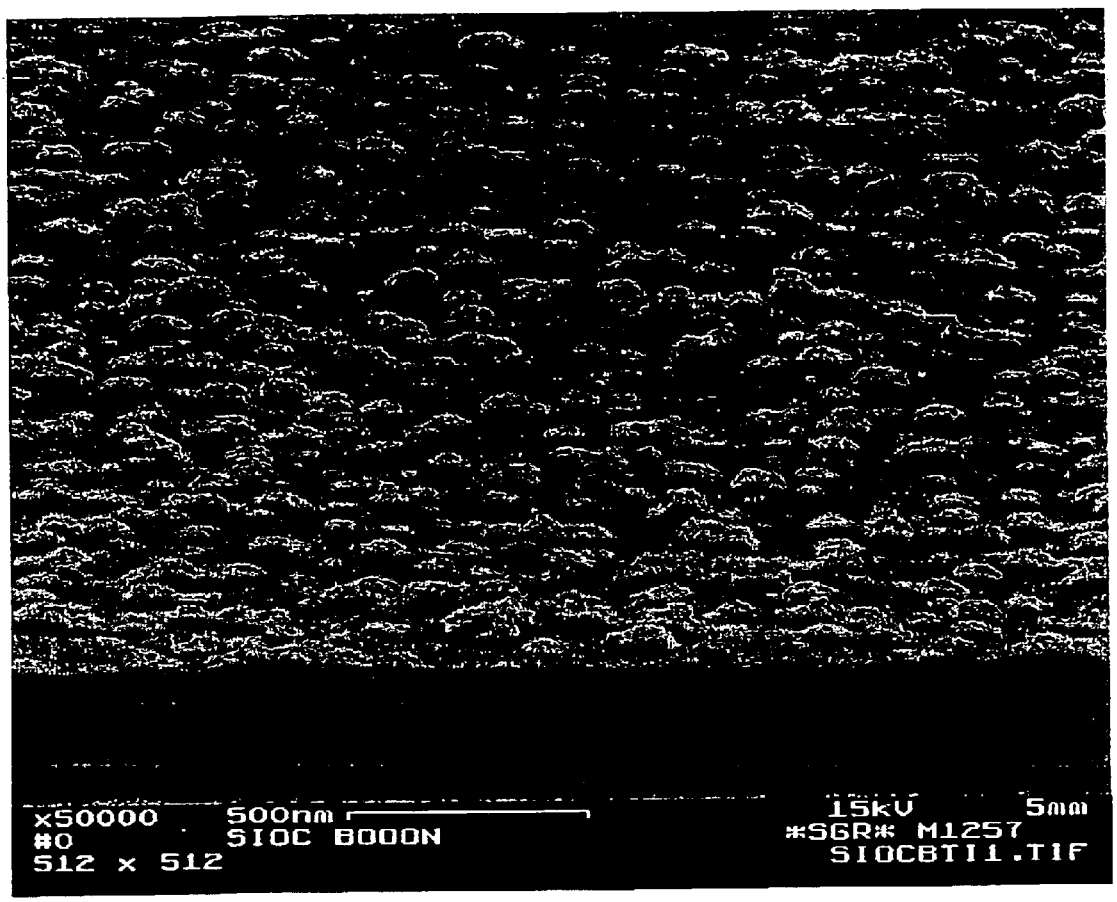
FIGS. 1–3: photographs obtained by electron scanning microscopy (SEM) of the surface of a layer according to one of the examples.
Figure 2:
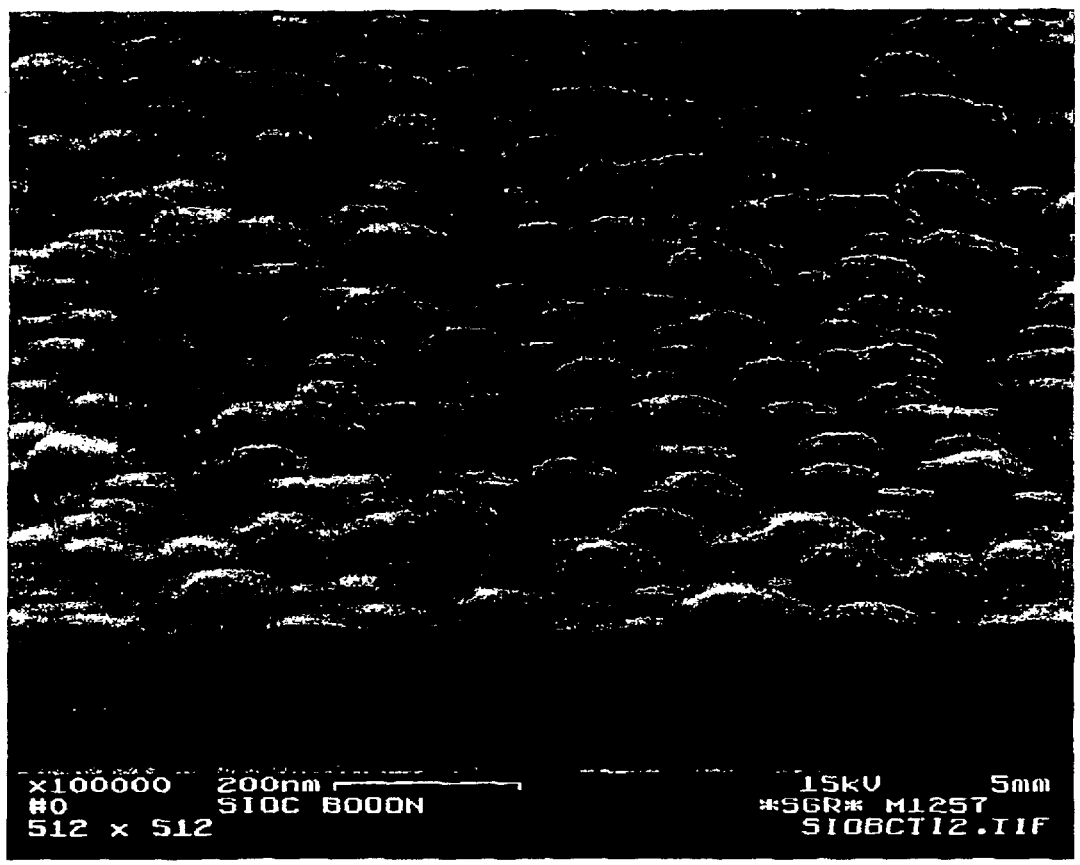
Figure 3:
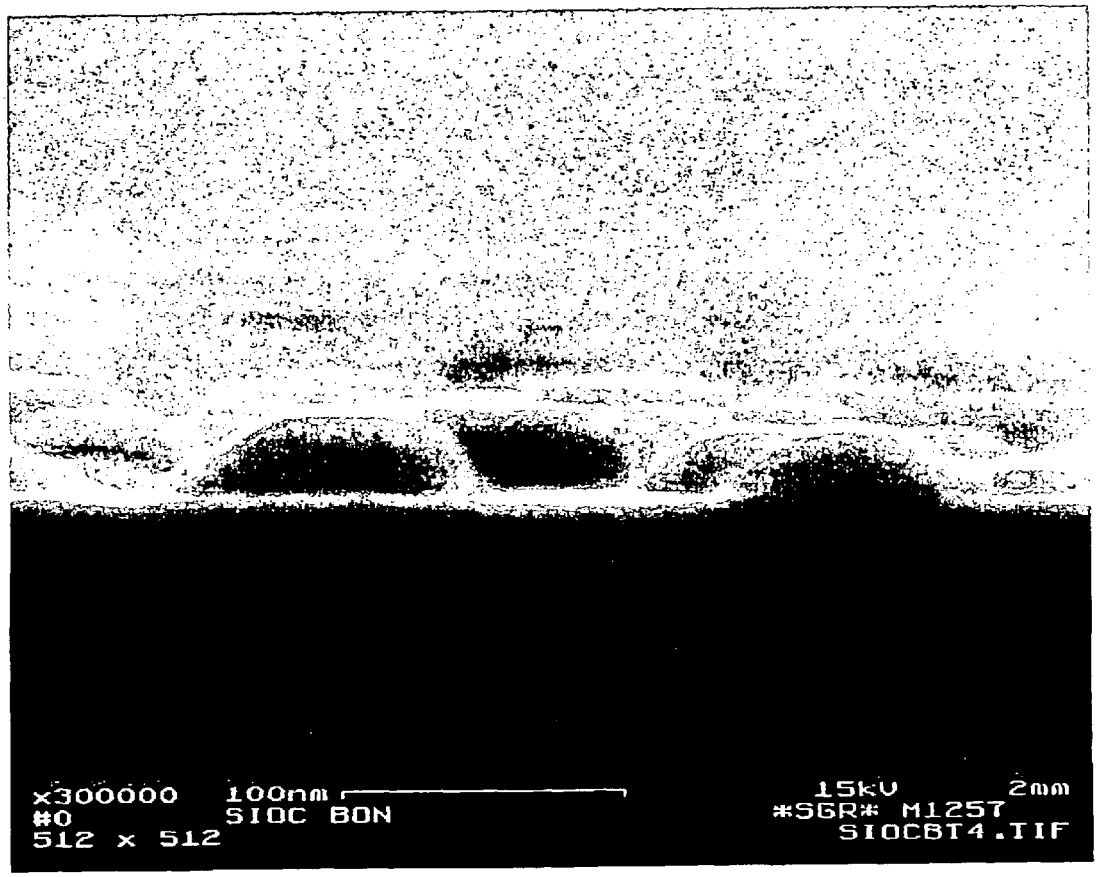

FIGS. 1–3 are photographs obtained by SEM of the layer according to Example 5, with three different magnifications. It may be noted that there is a particular surface porosity, with kinds of small blisters quite irregular in size and with quite flat tops. FIG. 3, taken at the highest magnification, shows "blisters" whose base, in its largest dimension, is within the range 60–80 to 100–110 nm.

They are compared with a comparative example, Comparative Example 8, consisting of Planilux glass without a layer:
- according to a laboratory test ("lab test"), in which they were stored for one, six and fourteen days in the atmosphere described within the context of Examples 1–4, namely 30+ C. and 95% relative humidity;
- according to an outdoor exposure test on an industrial site ("industrial site test"), in which they were stored for one and ten days in an atmosphere at 30° C. and at 95% relative humidity.

The results (expressed as "YES" or "NO", as in Table 1) are given in Tables 3 and 4 below

TABLE 3

|  | LABORATORY TEST | | |
|---|---|---|---|
|  | 1 day | 6 days | 14 days |
| Example 5 | YES | YES | YES |
| Comp. Example 8 | YES | NO | NO |

TABLE 4

|  | INDUSTRIAL SITE TEST | |
|---|---|---|
|  | 1 day | 10 days |
| Example 6 | YES | YES |
| Example 7 | YES | YES |
| Comp. Example 8 | YES | NO |

These results show that the layers according to the invention have a lasting "antimisting" effect, whereas the bare glass has this effect only very temporarily.

Another test was carried out on Examples 6, 7 and Comparative Example 8: the haze of the glasses provided with the layers according to Examples 6 and 7 and of the bare glass of Comparative Example 8 was measured after 10 days' storage outdoors on an industrial site (the haze is the diffuse light transmission, expressed as a percentage in the known manner).

The results are as follows: Examples 6 and 7 after 10 days have a limited haze (which is less than 1%), whereas Comparative Example 8 after 10 days had a significant haze (at least 5%) due to the build-up of dirt on the glass. This test confirms the fouling retardation effect of the layers according to the invention.

EXAMPLE 9

This example relates to a solar-control glass sold under the name "Antélio clair" by Saint-Gobain Glass France.

This is a 6 mm thick Planilux surmounted by a mixed Fe, Co, Cr oxide layer approximately 45 nm thick deposited by liquid-phase pyrolysis in a known manner.

According to the invention, a thin $SiO_2$-based layer according to the invention was deposited on the mixed oxide layer by the sol-gel route.

The sol was made from a solvent, namely 2-propanol, from 0.3N HCl in $H_2O$ and from tetraethyl orthosilocate TEOS.

The layer was deposited and cured in a conventional manner. The layer obtained had a thickness of less than or equal to 20 nm and a refractive index of about 1.45.

Contact angle measurements were carried out via those being compared with a Comparative Example 10 consisting just of the glass/Fe, Co, Cr mixed oxide Antélio glazing.

The following treatments were carried out in succession on Comparative Examples 9 and 10:

(a)—cleaning as previously, ozone treatment and UV treatment in order to remove the carbon-containing species adsorbed on the surface of the layer;

(b)—two days' ageing outdoors;

(c)—19 days' ageing outdoors;

(d)—cleaning test as previously

The contact angles with water were measured after each of these steps. The results are given in Table 5 below;

TABLE 5

|   | EXAMPLE 9 | COMPARATIVE EXAMPLE 10 |
|---|---|---|
| (a) | 17° | 5° |
| (b) | 32° | 53.1° |
| (c) | 43° | 79.3° |
| (d) | 24° | 71° |

It may be noted, from this data, that for Comparative Example 10, the contact angle rapidly increases outdoors and that a standard cleaning operation does not succeed in restoring a low contact angle. On the other hand, Example 9 becomes dirty much less quickly and its contact angle with water remains relatively low, even after several weeks; above all, the dirt comes off much more quickly after a standard cleaning operation: the glazing easily becomes clean again

EXAMPLE 11

This example relates to the deposition of a layer based only on silicon and oxygen (possibly containing other elements, but only as impurities in negligible amounts). The layer was deposited on a "Planilux" glass, as in the case of Examples 1–4, by CVD using $SiH_4$ and an oxidising compound, but without ethylene. A 50 nm silicon oxide layer with an index of 1.50 was obtained. Its contact angle with water, measured as in the case of Examples 1–4, was low, less than 10° (about 7°). The layer had the same antimisting effect as the layers of Examples 1 and 2.

What is claimed is:

1. A transparent substrate having at least one surface with a layer comprising at least one partially oxidized silicon derivative selected from the group consisting of silicon dioxide that is substoichiometric in terms of oxygen, silicon dioxide, silicon oxycarbide and silicon oxynitride, wherein the substrate has a hydrophilic character and wherein the concentration of said partially oxidized silicon derivative is homogenous across the thickness of the layer.

2. The substrate according to claim 1, wherein the refractive index of the silicon-derivative layer is between 1.45 and 1.80.

3. The substrate according to claim 1, wherein the layer is deposited by sol-gel or by pyrolysis.

4. The substrate according to claim 1, wherein the layer is rough on the external surface.

5. The substrate according to claim 1, wherein the contact angle between the surface of the layer and water is less than 35°.

6. The substrate according to claim 1, wherein the layer has an oxygen concentration increasing towards its external surface.

7. The substrate according to claim 1, wherein the layer has a high content of hydroxyl bonds Si—OH on the external surface.

8. The substrate according to claim 1, wherein the layer has a thickness of at least 5 nm.

9. The substrate according to claim 1, wherein the layer is the last layer of a film of thin layers.

10. The substrate according to claim 1, wherein the substrate is curved, toughened, annealed or a combination thereof, before or after deposition of the layer.

11. The substrate according to claim 1, wherein the silicon derivative comprises at least one additive in a minor amount with respect to silicon.

12. The substrate of claim 1, wherein the substrate comprises glass.

13. The substrate of claim 1, wherein the refractive index of the silicon-derivative layer is between 1.50 and 1.75.

14. The substrate according to claim 1, wherein the refractive index of the silicon-derivative layer is between 1.55 and 1.68.

15. The substrate according to claim 1, wherein the layer is deposited by chemical vapor deposition.

16. The substrate according to claim 1, wherein the contact angle between the surface of the layer and water is less than or equal to 30°.

17. The substrate according to claim 1, wherein the contact angle between the surface of the layer and water is between 15° and 25°.

18. The substrate according to claim 1, wherein the contact angle between the surface of the layer and water is less than or equal to 10°.

19. The substrate according to claim 1, wherein the layer has a thickness of between 10 nm and 60 nm.

20. The substrate according to claim 9, wherein the film is an antireflection film, solar-control film or a low emissivity film.

21. The substrate according to claim 11, wherein the additive is a metal.

22. The substrate according to claim 21, wherein the metal is aluminum, zinc or zirconium.

23. A glazing comprising the substrate of claim 1.

24. The glazing of claim 22, wherein the glazing is selected from the group consisting of a building glazing, a vehicle glazing, a mirror, a glazed door, an internal partition, urban furniture, display panels, bathroom mirrors, rear-view mirrors, display panels and display screens.

25. A transparent substrate having at least one surface with a layer comprising at least one partially oxidized silicon derivative wherein the layer has an oxygen concentration that increases across the layer in a direction towards the external surface wherein the surface closest to the substrate is almost pure silicon dioxide and wherein the partially oxidized silicon derivative is selected from the group consisting of silicon dioxide that is substoichiometric in terms of oxygen, silicon dioxide, silicon oxycarbide and silicon oxynitride, wherein the substrate has a hydrophilic character.

26. The substrate according to claim 25, wherein the refractive index of the silicon-derivative layer is between 1.45 and 1.80.

27. The substrate according to claim 25, wherein the layer is deposited by sol-gel or by pyrolysis.

28. The substrate according to claim 25, wherein the layer is rough on the external surface.

29. The substrate according to claim 25, wherein the contact angle between the surface of the layer and water is less than 35°.

30. The substrate according to claim 25, wherein the layer has an oxygen concentration increasing towards its external surface.

31. The substrate according to claim 25, wherein the layer has a high content of hydroxyl bonds Si—OH on the external surface.

32. The substrate according to claim 25, wherein the layer has a thickness of at least 5 nm.

33. The substrate according to claim 25, wherein the layer is the last layer of a film of thin layers.

34. The substrate according to claim 25, wherein the substrate is curved, toughened, annealed or a combination thereof, before or after deposition of the layer.

35. The substrate according to claim 25, wherein the silicon derivative comprises at least one additive in a minor amount with respect to silicon.

36. The substrate of claim 25, wherein the substrate comprises glass.

37. The substrate of claim 25, wherein the refractive index of the silicon-derivative layer is between 1.50 and 1.75.

38. The substrate according to claim 25, wherein the refractive index of the silicon-derivative layer is between 1.55 and 1.68.

39. The substrate according to claim 25, wherein the layer is deposited by chemical vapor deposition.

40. The substrate according to claim 25, wherein the contact angle between the surface of the layer and water is less than or equal to 30°.

41. The substrate according to claim 25, wherein the contact angle between the surface of the layer and water is between 15° and 25°.

42. The substrate according to claim 25, wherein the contact angle between the surface of the layer and water is less than or equal to 10°.

43. The substrate according to claim 25, wherein the layer has a thickness of between 10 nm and 60 nm.

44. The substrate according to claim 33, wherein the film is an antireflection film, solar-control film or a low emissivity film.

45. The substrate according to claim 33, wherein the additive is a metal.

46. The substrate according to claim 45, wherein the metal is aluminum, zinc or zirconium.

47. A glazing comprising the substrate of claim 25.

48. The glazing of claim 46, wherein the glazing is selected from the group consisting of a building glazing, a vehicle glazing, a mirror, a glazed door, an internal partition, urban furniture, display panels, bathroom mirrors, rear-view mirrors, display panels and display screens.

* * * * *